United States Patent [19]
Mochan et al.

[11] 3,874,863
[45] Apr. 1, 1975

[54] METHOD FOR RENEWING A GLASS MAKING OPERATION COOLANT

[75] Inventors: Casmir F. Mochon, Toledo; Joseph E. Poley, Rossford; Donald E. Shamp, Millbury, all of Ohio

[73] Assignee: Libbey-Owens-Ford Company, Toledo, Ohio

[22] Filed: Jan. 14, 1974

[21] Appl. No.: 432,987

[52] U.S. Cl. ............................ 65/27, 106/DIG. 8
[51] Int. Cl. ........................................... C03b 1/00
[58] Field of Search ................ 65/27; 106/DIG. 8

[56] References Cited
UNITED STATES PATENTS

| | | | |
|---|---|---|---|
| 2,220,750 | 11/1940 | Blair et al. | 65/27 X |
| 3,203,816 | 8/1965 | Bull et al. | 65/27 X |
| 3,234,034 | 2/1966 | Jasinski et al. | 65/27 X |
| 3,294,555 | 12/1966 | Krinov | 65/27 X |
| 3,728,094 | 4/1973 | Bowman | 65/27 |
| 3,791,807 | 2/1974 | Etzel et al. | 65/27 X |

Primary Examiner—Arthur D. Kellogg
Attorney, Agent, or Firm—Collins, Oberlin & Darr

[57] ABSTRACT

A method for renewing a recirculating coolant employed to cool various devices used in the production of glass before the level of hardness and solids content of the coolant increases beyond acceptable limits. The coolant, comprised of tap water and a rust or corrosion inhibiting material, is circulated within a closed system. A measured quantity of the coolant is withdrawn at frequent intervals from the closed system and used as the liquid medium in making up batches of raw glass making materials. Like quantities of demineralized or soft water, and additional rust inhibiting material, are added to the coolant remaining in the system for maintaining the hardness and corrosiveness of the coolant in a range that inhibits the build up of deposits and rust and corrosion within the closed system, respectively.

6 Claims, 1 Drawing Figure

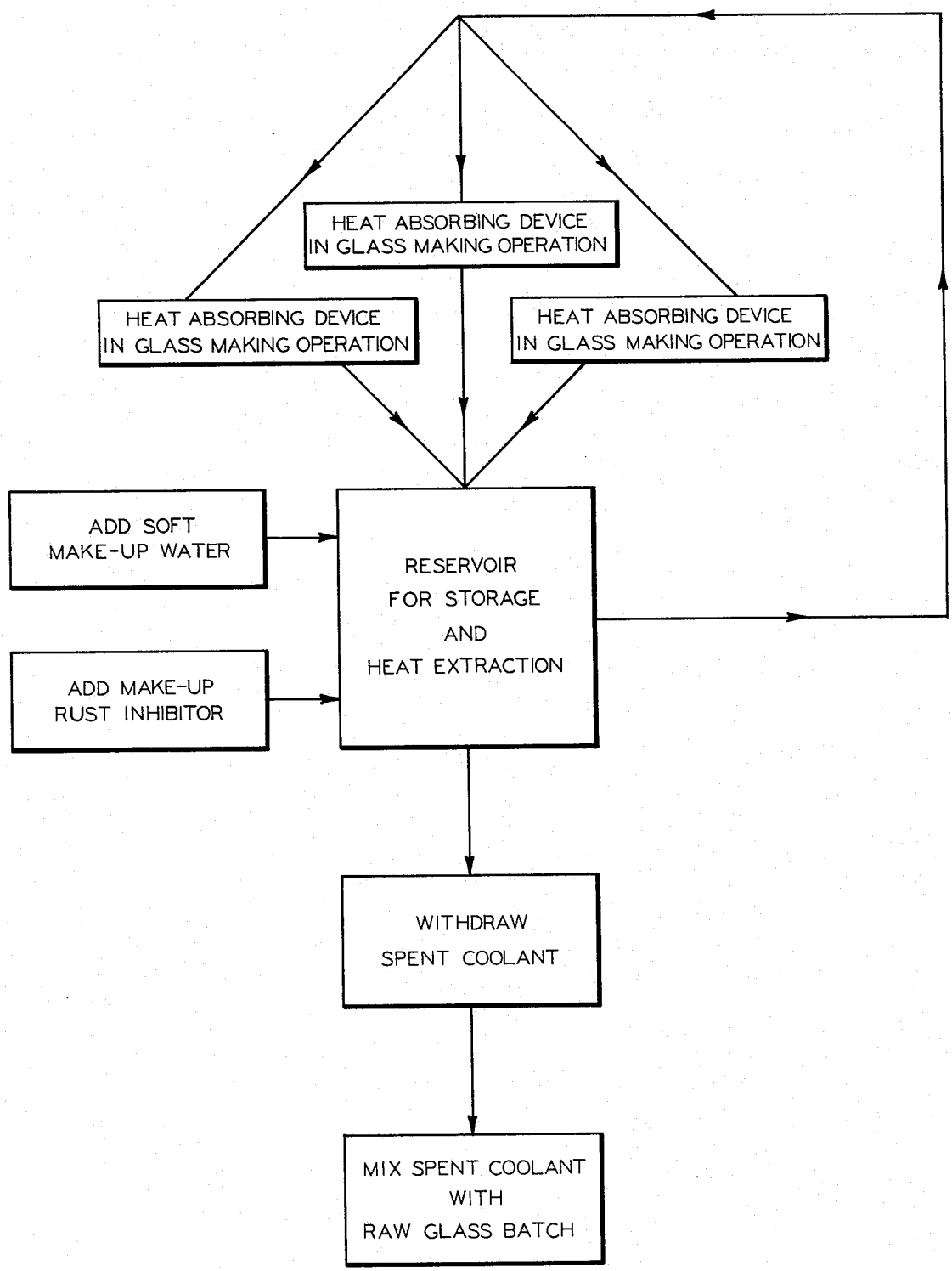

METHOD FOR RENEWING A GLASS MAKING OPERATION COOLANT

BACKGROUND OF THE INVENTION

1. Field of the Invention

This invention generally relates to the production of glass, and more particularly to a method for operating a glass production line by using a portion of the coolant employed in its recirculating system before it becomes unacceptable for further use in the various devices employed in the over-all glass making operation.

2. Description of the Prior Art

Various types of coolers, as well as other devices which must be cooled to operate properly, are used in the production of glass. Large amounts of heat absorbing medium must be flowed therethrough for their efficient operation, particularly in the high operating temperatures required in the basic glass making operation.

Ordinary tap water usually having a hardness range of 70 to 85 parts per million is an excellent medium for cooling the above-mentioned devices. As herein used, the degree of hardness of water is conventionally defined in terms of grains of calcium carbonate ($CaCO_3$) per gallon of water and one grain of $CaCO_3$ is equivalent to about 17 parts per million. Also soft water is defined as having a hardness up to 5 grains or 85 parts per million and very hard water is defined as having a hardness of over 30 grains or 510 parts per million.

However, ordinary tap water has two inherent disadvantages. First, its dissolved hardness constituents precipitate out of solution particularly at elevated temperatures, and form deposits on the interior walls of the cooling devices. This coating insulates the chambers and reduces the rate of heat transfer through the walls. Further, this coating may not be uniform since it forms more rapidly at areas of higher temperature, resulting in hot spots along the wall which accelerate formation of the coating still more until the wall becomes so hot as to "burn out" and begin leaking at these points. As a result, the units must be repaired or replaced. Second, the reaction of water with the types of metal required in the construction of the cooling units, causes rust and corrosion thereof. In order to alleviate these disadvantages, the devices are connected in a closed recirculating system charged with tap water which is originally demineralized and contains a rust inhibiting material.

However, over a period of time the hardness and solids content of the coolant can increase due to leaching from the ground when it is held in a pond for cooling as well as addition of chemicals, to levels where it readily forms deposits in the passageway of the system which impedes the flow of coolant therethrough and reduces the rate of transfer of heat from the devices to the coolant. Therefore, the coolant should be replaced or otherwise treated before its hardness and solids content reach unacceptable levels. Since the rust inhibiting material makes the coolant unacceptable under current environmental standards, it cannot simply be discharged into existing sewers or streams. Thus, since large quantities of coolant are involved in the production of glass, disposal of spent coolant for replacement by fresh coolant constitutes a major problem.

SUMMARY OF THE INVENTION

Generally speaking, the method of the present invention involves the over-all glass making process and particularly the preparation of raw glass making materials or batch. Thus, in the preparation of glass batch a small amount of liquid is added to the mixer along with the dry ingredients to aid in mixing and to permit achievement of a higher degree of homogeneity. In accordance with the invention, measured amounts of the coolant are withdrawn from the coolant recirculating system and used in place of the tap water normally employed in the mixing of the batches of pulverized raw glass making materials which are fed into the charging end of a continuous glass melting furnace. Therefore, the recirculating system may be provided with a metering device whereby measured amounts of coolant can be withdrawn and added to the raw glass making materials each time a batch is being mixed in the conventional manner. A like amount of demineralized or soft water and additional rust inhibiting material are added, either simultaneously with the withdrawal of the coolant from the system or at intermittent intervals, to the closed recirculating system in a sufficient quantity to renew the coolant in the system. In this manner, sufficient coolant is withdrawn from the system and used in the glass making process, with fresh demineralized coolant being charged into the cooling system to thereby eliminate the problems of disposal of the spent coolant and the build up of the hardness and solids content of the coolant remaining in the system, respectively.

OBJECTS AND ADVANTAGES

It is therefore an object of this invention to provide a method for renewing a coolant by withdrawing measured quantities thereof from the system and using it in the glass making process and charging the remaining coolant with fresh materials.

Another object of this invention is to maintain the composition of a recirculating body of coolant within acceptable levels over an extended period of time.

Another object of this invention is to dispose of a spent coolant whose hardness and solids content have increased by using it in making up the raw glass material batches.

Other objects and advantages will become more apparent during the course of the following description when taken in conjunction with the accompanying flow diagram.

BRIEF DESCRIPTION OF THE DRAWING

The single drawing is a flow diagram showing a preferred method for carrying out the present invention.

DETAILED DESCRIPTION OF THE PREFERRED EMBODIMENT

The raw glass batch employed in a typical flat glass making process is comprised primarily of pulverized sand, limestone and soda ash, along with lesser amounts of minor ingredients to impart various desired characteristics to finished glass sheets. Accurately weighed and proportioned amounts of the above-mentioned ingredients are mixed and deposited at intervals into a reservoir from which they are continuously charged into one end of a continuous glass melting furnace. In this part of the glass making process, it is well known to add a certain amount of liquid to the batch mixture to facilitate mixing of the dry ingredients, preserve the homogeneity of the mixture during handling and prevent dust from being carried into the checkerwork of the furnace. Normally, tap water comprising on the order of 4 to 6% of the weight of the batch mixture is the liquid employed in the preparation thereof, and, in a typical glass making operation, amounts to a daily usage of about 2,000 gallons of water.

As previously indicated, a liquid heat absorbing medium is employed to cool various devices located throughout the glass production line from the melting furnace to the lehr, and is circulated within a closed system. This sytem includes a holding and cooling pond or tank where the coolant can conveniently be held for disbursing absorbed heat into the atmosphere. Initially, a desired amount of coolant is made up by adding to suitably treated water such as ordinary tap water, a rust inhibiting material such as sodium chromate so that it, the sodium chromate, comprises about 550 parts per million of the coolant whose hardness is desirably in the range of 70 to 85 parts per million. This concentration of the rust inhibiting material has been found to provide maximum protection against rusting and corrosion of the various devices requiring cooling. Normally, once the system is charged with coolant, the coolant is continuously circulated therethrough. Also as previously indicated, the hardness and dissolved solids content of the coolant increases over an extended period of time due to various factors such as leaching of minerals from the earth in the pond and addition of metal oxides from the circulating system. For example, it has been found that over an extended period of use the hardness of the coolant has built up to 590 parts per million and has a total solids content of about 2,000 parts per million. At the temperatures to which the coolant is elevated some of these materials may drop out of solution and form an insulative coating in the cooling chambers of the various devices, so that disposal or treatment of the coolant becomes necessary.

It has been discovered that when the rust inhibiting material comprises as much as 550 parts or more per million of the coolant, the coolant can be used in the make up of the batch without adversely affecting the finished glass sheets.

Thus, the first step in this novel method of renewing a coolant in a continuous glass producing operation is to withdraw from the coolant recirculating system an amount of coolant equivalent to the 4 to 6% of the weight of the batch of raw glass making materials, which is the same as the amount of water conventionally used in the make up of glass batch. Next, the measured amount of withdrawn coolant is mixed with the raw glass making materials or batch in any well known manner. Thereafter, a like quantity of tap water, but preferably a soft demineralized water having a hardness of only about 3 parts per million is added to the coolant recirculating system for reducing the hardness of the coolant. Thus, as previously indicated, about 2,000 gallons of fresh water per day are added to the closed system. Also, at this time, additional rust inhibiting material is added to the system to maintain the level thereof at about 550 parts per million. In this manner the level of hardness of the coolant may gradually be reduced to acceptable levels within an existing system without fear of an environmental problem due to discharge of the coolant. Of course, the hardness can thereafter be maintained at a relatively low level, providing obvious benefits in the reduction of scale formation within the various heat absorbing devices. Since at high levels hardness causing constituents can be removed from the cooling system at a rate faster than they accumulate in this manner, an equilibrium point will eventually be reached in any system which is well below the operational maximum.

Reviewing briefly the method of the present invention, measured quantities of coolant are withdrawn from the closed system and mixed with the raw glass making materials for forming batches to be charged into a glass melting tank. Like quantities of soft or demineralized water including additional rust inhibiting materials are then added to the coolant in the system.

From the foregoing, it is apparent that the method of operating a glass production line and renewing a coolant as herein disclosed is of particular value in the disposition of a spent coolent from a closed recirculating system wherein such coolant is used in a related process in making glass. Thus, the method makes possible a substantial savings in cost as the spent coolant does not have to be stored or further treated for disposal purposes.

It is to be understood that the form of the invention herewith shown and described is to be taken as an illustrative embodiment only of the same and that various procedural changes may be resorted to without departing from the spirit of the invention.

We claim:

1. A method for renewing a coolant comprised of tap water and a rust inhibiting agent contained in a closed system, whose hardness has increased beyond acceptable limits from use in cooling devices employed in a glass making operation, by using measured quantities thereof in a batch of raw glass making materials, comprising the steps of:
   a. drawing off measured quantities of coolant from the closed system;
   b. mixing said measured quantities of drawn off coolant with pulverized raw glass making materials to form a batch; and
   c. adding measured quantities of soft water to the coolant remaining in the system for reducing the hardness content thereof.

2. The method for renewing a coolant as claimed in claim 1, wherein the drawn off quantity of coolant is in the range of 4 to 6% of the weighed mixture of the batch material.

3. The method for renewing a coolant as claimed in claim 1, wherein the added quantity of said soft water is in the range of 4 to 6% of the weighed mixture of the batch material.

4. The method for renewing a coolant as claimed in claim 1, including the step of demineralizing said soft water to a hardness of not greater than about 3 parts per million.

5. The method for renewing a coolant as claimed in claim 4, wherein the quantity of said demineralized water added to the system is in the range of 4 to 6% of the weighed mixture of the batch material.

6. The method for renewing a coolant as claimed in claim 1, including the step of adding additional rust inhibiting agents to the coolant remaining in the system for maintaining the level of said rust inhibiting agent at about 550 parts per million.

* * * * *